United States Patent
Kawahara et al.

(10) Patent No.: US 7,445,091 B2
(45) Date of Patent: Nov. 4, 2008

(54) ELECTRICALLY OPERATED BRAKE

(75) Inventors: Yoshinari Kawahara, Fukuoka (JP); Kousaku Ohno, Mito (JP); Atsushi Yokoyama, Yamato (JP); Mitsuhide Sasaki, Isehara (JP)

(73) Assignee: Hitachi, Ltd., Tokyo (JP)

( * ) Notice: Subject to any disclaimer, the term of this patent is extended or adjusted under 35 U.S.C. 154(b) by 15 days.

(21) Appl. No.: 11/629,977

(22) PCT Filed: Jun. 21, 2004

(86) PCT No.: PCT/JP2004/009058
§ 371 (c)(1), (2), (4) Date: Dec. 19, 2006

(87) PCT Pub. No.: WO2005/124182
PCT Pub. Date: Dec. 29, 2005

(65) Prior Publication Data
US 2008/0029355 A1 Feb. 7, 2008

(51) Int. Cl.
*F16D 55/08* (2006.01)
(52) U.S. Cl. .................. 188/1.11 L; 188/158; 303/20; 701/70
(58) Field of Classification Search .......... 303/3, 303/15, 20; 188/1.11 L, 158–164; 701/70–81
See application file for complete search history.

(56) References Cited

U.S. PATENT DOCUMENTS

| | | | |
|---|---|---|---|
| 5,539,641 A * | 7/1996 | Littlejohn | 701/70 |
| 6,158,822 A * | 12/2000 | Shirai et al. | 303/3 |
| 6,231,133 B1 * | 5/2001 | Tsukamoto | 303/122.04 |
| 6,279,694 B1 | 8/2001 | Boehm et al. | |
| 6,464,308 B2 | 10/2002 | Kubota | |
| 6,748,310 B2 * | 6/2004 | Tamasho et al. | 701/70 |
| 7,104,364 B2 * | 9/2006 | Godlewsky et al. | 188/1.11 L |
| 2001/0033106 A1 * | 10/2001 | Shirai et al. | 303/177 |

FOREIGN PATENT DOCUMENTS

| | | |
|---|---|---|
| JP | 11-513337 A | 11/1999 |
| JP | 2000-110865 A | 4/2000 |
| JP | 2002-67932 A | 3/2002 |
| JP | 2002-81475 A | 3/2002 |
| JP | 2003-106355 A | 4/2003 |

* cited by examiner

*Primary Examiner*—Christopher P Schwartz
(74) *Attorney, Agent, or Firm*—Crowell & Moring LLP

(57) ABSTRACT

An electrically operated brake device in which braking force differences between electrically operated brakes are reduced to prevent unstable vehicle traveling during braking.

Motors 13 of electrically operated brakes are returned to standard positions during the stop of a vehicle and the motor 13 of each of the brakes is driven for a predetermined amount, pressing a brake pad 17 against a disc rotor 18 to produce a braking force.

An electric current value of each motor 13 in the above operation is measured and differences between the values are calculated. Electric current of each motor is increased or decreased so that there is no current difference between the motors 13. Based on a drive amount of each motor in this operation, standard positions of the motors are determined and updated. Repeating the above operations reduces braking force differences between the brakes.

12 Claims, 3 Drawing Sheets

ELECTRICALLY OPERATED BRAKE

TECHNICAL FIELD

The present invention relates to an electrically operated brake device generating a braking force by operation of an electric motor.

BACKGROUND ART

When a brake device for generating a braking force by operation of a motor without using hydraulic means on a plurality of wheels of a vehicle, it is necessary to control the braking force of each wheel separately. Accordingly, if the braking force control is not sufficiently accurate, there is a possibility that a braking force difference may be caused to make the behavior of each wheel unstable. For example, when a braking force difference is caused between the right and the left wheel of a vehicle, a yaw angular velocity is generated upon brake in the vehicle body and a passenger feels unpleasant feeling. Moreover, in the worst case, the vehicle body may spin.

It should be noted that in a case of a train, the right and the left wheel are connected to each other in general, and the braking force difference between the right and the left wheel will not cause a significant problem.

In general, in case of a disc brake, the wheel braking force is determined by a force (piston thrust) pressing a brake pad against a disc rotor. Consequently, in order to reduce the braking force difference between the right and the left wheel of a vehicle, it is necessary to accurately control the piston thrust. In general, the piston thrust may be controlled currently by one of the following three methods.

The first method uses a thrust sensor for measuring piston thrust mounted on an electrically operated brake and performs feedback control of the piston thrust. By using a thrust sensor of high resolution, it is possible theoretically to accurately control the piston thrust. However, vibration attributed to convex/concave portions of a road is applied to the electrically operated brake, the reliability of the thrust sensor is lowered. Moreover, when using a thrust sensor of high resolution, it is necessary to increase the resolution of an AD converter, which in turn increases the cost. Furthermore, since the temperature of the electrically operated brake is determined by the ambient temperature and the temperature of the brake pad and is not constant. Accordingly, in case of a distortion gauge type thrust sensor, the sensor temperature drift also causes a problem and the control mechanism is complicated.

In the second method, the relationship between the current flowing in the motor and the piston thrust is obtained in advance, and by referencing the graph of the motor current/piston thrust, a current corresponding to the required piston thrust is fed to the motor. Since there is a constant relationship between the motor current and the motor torque, this method is considered to be simple. Actually, however, since the transmission efficiency in the power transmission system is not 100%, during increase and decrease of the piston thrust, a hysteresis is caused, i.e., the relationship between the motor current and the piston thrust is not uniquely defined. The transmission efficiency of the power transmission system is changed by the temperature and the lubrication state of the sliding part and is not constant. Accordingly, the control of the piston thrust based only on the motor current is difficult.

In the third method, the relationship between the piston position decided by the motor position and the piston thrust is obtained in advance and by referencing the graph, the motor is controlled to the motor position corresponding to the required piston thrust. In this method, it is necessary to obtain the motor position corresponding to the contact position between the brake pad and the disc rotor and accurately estimate the rigidity of the entire system.

JP-A-11-513337 discloses a technique for the object of the aforementioned third method. The technique detects a contact position between a disc rotor and a brake pad. If the contact position of the brake pad with each wheel can be accurately detected, it is possible to reduce the braking force difference between the wheels when the third method is used.

In a first method disclosed in JP-A-11-513337, if there is a gap between the brake pad and the disc rotor, the motor is accelerated by almost constant torque in a direction to reduce the gap and the inversion of the sign of the motor acceleration caused when the brake pad is brought into contact is detected, thereby judging the contact position. Moreover, in a second method disclosed in JP-A-11-513337, a contact pin is provided in the brake pad, and when the contact pin is brought into abutment with the disc rotor, the contact pin closes a current circuit so as to generate a contact signal.

DISCLOSURE OF THE INVENTION

During a non-brake state, in the disc brake device, a gap is assured between the disc rotor and the brake pad so as to prevent generation of an unintentional braking force. In the first method of the aforementioned conventional technique, when the brake pad reduces the aforementioned gap, the motor torque should be adjusted to be slightly greater than a friction torque of the motor including the connected mechanism and reduce the motor torque as much as possible. This is because if the motor torque is great, the contact of the brake pad with the disc rotor will not immediately inverse the sign of the motor acceleration and the contact position detection accuracy is lowered. However, when the motor torque is set to be small, the motor acceleration becomes a small value and the motor acceleration measurement value becomes highly sensitive against the internal fluctuation and the friction state of the power transmission system. Accordingly, there is a problem that it is difficult to determine the motor torque for sufficiently accurately detecting the pad contact position. Moreover, in the second method of the aforementioned conventional technique, the difference of tip position of the contact pin arranged in the brake pad and the position of the brake pad surface should be constant. However, when the contact pin and the brake pad are made of different materials, or when the contact pin and the brake pad have different wear speed depending on the contact pin mounting method and the pad wear proceeds, there is a possibility that an error is caused in the positional relationship between the contact pin tip and the pad surface. Moreover, since a large force is applied to the brake pad, there is a problem of reliability when the contact pin is arranged in the brake pad.

As has been described above, in a vehicle having electrically operated brakes mounted on a plurality of wheels, it is not easy to reduce the braking force difference between the wheels by using the conventional technique.

It is therefore an object of the present invention to provide a technique for reducing the braking force difference between the right and the left wheels of a vehicle even if the contact position between the brake pad and the disc rotor is not accurately detected and assuring safe travel of the vehicle.

The present invention in characterized in that the electrically operated brake in which a brake pad position is normally controlled by controlling the motor drive amount has a function for updating a motor wait position according to a motor current value of a plurality of electrically operated brakes upon vehicle stop.

The electrically operated brake specifically includes: a motor; a piston driven by operation of the motor; a brake pad moved rectilinearly by the piston; a disc rotor sliding by the brake pad pressed by the advance of the piston; and a control device for controlling a displacement amount of the motor or a thrust of the brake pad. The electrically operated brake further includes: a current detection device for detecting current flowing in the right and left motors arranged on the rear right and left wheels or/and the front right and left wheels; and a processing device for inputting current value signals flowing in the right and the left motor and performing processing calculation for outputting a thrust signal of the piston based on the inputted current values.

According to the present invention, it is possible to provide a technique for reducing the braking force difference between the right and the left wheel of a vehicle even if the contact position between the a brake pad and a disc rotor is not accurately detected and assure safe travel of the vehicle.

Moreover, according to the present invention, during the non-brake state, motor currents of a plurality of electrically operated brakes are compared and aligned so as to surely reduce the braking force difference between the electrically operated brakes. Moreover, a motor standard position obtained by the aforementioned operation is stored and the aforementioned operation is repeated a plurality of times so that brakes forces by a plurality of electrically operated brakes are accurately matched.

An embodiment of the present invention provides an electrically operated brake including: a motor; a piston driven by operation of the motor; a brake pad moved rectilinearly by the piston; a disc rotor sliding by the brake pad pressed by the advance of the piston; and a control device for controlling a displacement amount of the motor or a thrust of the brake pad. The electrically operated brake further includes: a current detection device for detecting current flowing in the right and left motor arranged on the rear right and left wheel or/and the front right and left wheels; and a processing device for inputting a current value signal flowing in the right and the left motor, aligning the current values, and performing processing calculation for outputting a thrust signal of the piston based on the aligned current value.

The processing device obtains a current value difference between the inputted right and left motors and compares the current difference to a present value so as to judge whether to perform processing for aligning the current values.

The processing device obtains a standard position of the motor when the operation for releasing the thrust signal is repeated a plurality of times and stores it in a storage device. A statistical processing is performed for the standard position of the motor based on the plurality of times and a set standard position can be arranged.

When the thrust signal is released, the control device can drive the brake pad so that the wait position of the brake pad with respect to the disc rotor is an almost identical position.

Moreover, the present embodiment provides an electrically operated brake including: a motor; a piston driven by operation of the motor; a brake pad moved rectilinearly by the piston; a disc rotor sliding by the brake pad pressed by the advance of the piston; and a control device for controlling a displacement amount of the motor. The electrically operated brake further includes: a current detection device for detecting current flowing in the right and left motor arranged on the rear right and left wheel or/and the front right and left wheels.

The right and the left brake pad constitute an electrically operated brake driven according to a difference between current values.

THE BEST MODE FOR CARRYING OUT THE INVENTION

Embodiment 1

Figure 1:
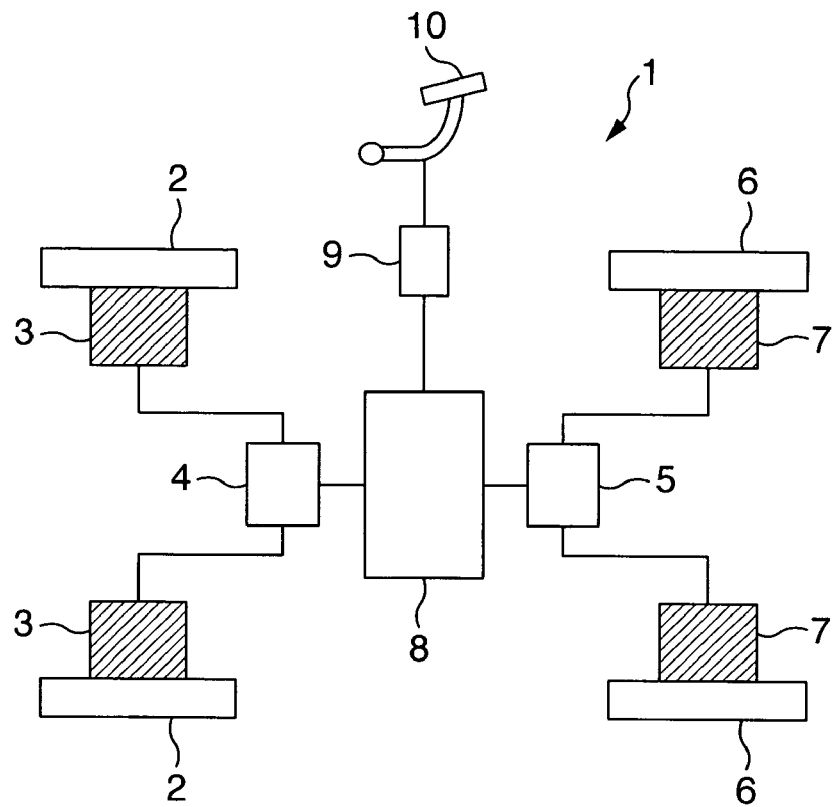
FIG. 1 shows a general system configuration of a vehicle in which an electrically operated brake is provided on each of four wheels.

Description will now be directed to an embodiment of the present invention with reference to FIG. 1 to FIG. 5. FIG. 1 shows a general system configuration of a vehicle in which an electrically operated brake is provided on each of four wheels. In FIG. 1, the electrically operated brake device 1 is formed by front wheel brakes 3 mounted on front wheels 2 of the vehicle, a front wheel controller 4 for controlling the front wheel electrically operated brake 3, rear wheel brakes 7 mounted on rear wheels 6, a rear wheel controller 5 for controlling the electrically operated brakes 7 of the rear wheels, a main controller 8 for controlling the front wheel controller 4 and the rear wheel controller 5, a brake pedal 19 used by a driver to adjust the brake intensity, and a pedal force sensor 9 for measuring the pressing force applied to the brake pedal 10.

Explanation will be given on operation of each of the components in FIG. 1. In FIG. 1, when the driver presses the brake pedal 10, the pressing force applied to the brake pedal is measured by the pedal force sensor 9. The measured pressing force data is inputted to the main controller 8. According to this, braking force division to the front and the rear wheels is decided. Next, the main controller 8 transmits instruction values of the front wheel braking force and rear wheel braking force to the front wheel controller 4 and to the rear wheel controller 5. According to the instruction values, the front wheel controller 4 and the rear wheel controller 5 operate the electrically operated brakes 3 of the front wheels and the electrically operated brakes 7 of the rear wheels, respectively, thereby controlling the right and left wheel braking forces of the front wheels 2 and the rear wheels 6.

Figure 2:
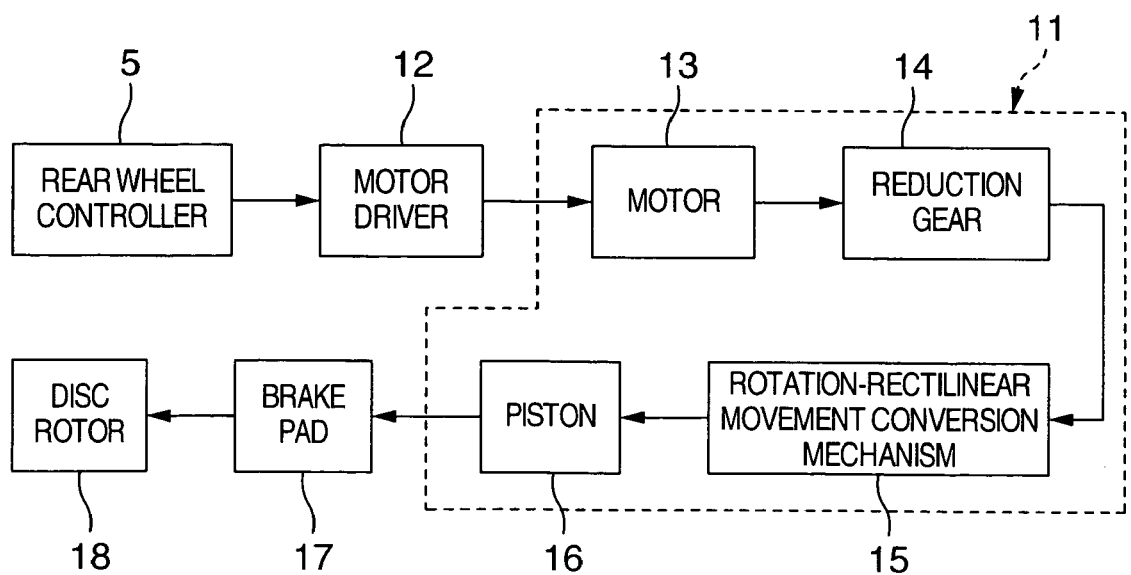
FIG. 2 explains the components in the electrically operated brake.

Referring to FIG. 2, explanation will be given on the components in the electrically operated brake through an example of electrically operated brakes 7 of the rear wheels. As shown in FIG. 2, the rear wheel electrically operated brake is formed by a motor driver 12 controlled by the rear wheel controller 5, a motor 13 controlled by a current instruction from the motor driver 12, a reduction gear 14 for reducing the rotation speed of the motor 13, a rotation-rectilinear movement conversion mechanism 15 for converting rotation into rectilinear movement, a piston 16 fixed to the rectilinear movement portion of the rotation-rectilinear movement conversion mechanism 15, a brake pad 17 mounted on the piston 16, and a disk rotor 18 pressed by the brake pad 17. Moreover, the motor 13, the reduction gear 14, the rotation-rectilinear movement conversion mechanism 15, and the piston constitute a rear wheel actuator 11. It should be noted that configuration of the front wheel electrically operated brake is identical to that of the rear wheel electrically operated brake 7 and its explanation is omitted. Moreover, the right and the left wheel of the rear wheels and the right and the left wheel of the front wheels have identical mechanism and explanation will be given on the example of the rear wheel electrically operated brake 7.

Figure 3:
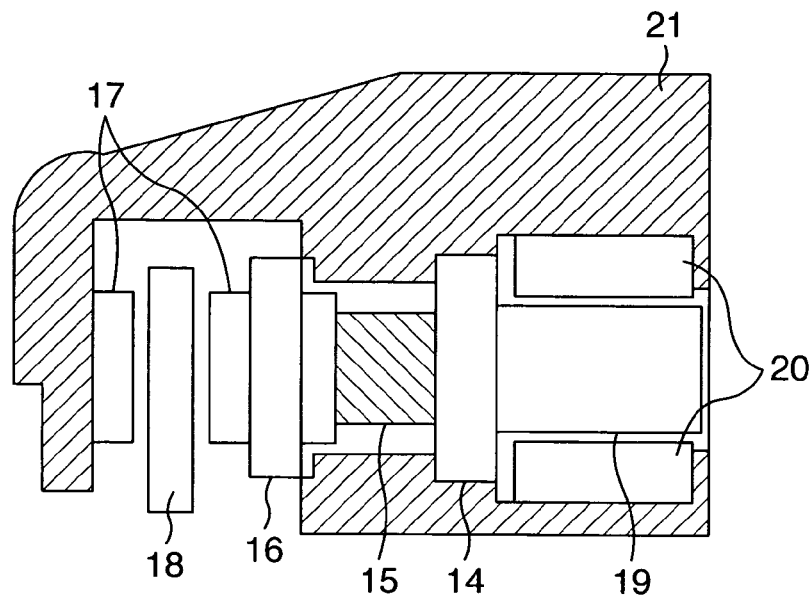
FIG. 3 schematically explains an outline of electrically operated brake caliper components.

FIG. 3 is a diagram explaining a general configuration of the entire electrically operated brake caliper. Referring to FIG. 3, explanation will be given on operation of the respective components of the rear wheel electrically operated brake 7. The motor 13 shown in FIG. 2 is formed by a stator 20 and a rotor 19 shown in FIG. 3 and includes a resolver for detecting a rotation angle. When a current instruction is sent from the motor driver 12 to the motor 13 shown in FIG. 2, a rotation torque is generated in the rotor 19. The rotation torque generated in the rotor 19 is inputted to the reduction gear 14 so as to reduce the rotation speed and increase the rotation torque. The rotation torque increased by the reduction gear 14 drives the rotation-rectilinear movement conversion mechanism 15 and the piston 16 moves forward. The brake pad 17 mounted on the piston 16 also advances together with the piston 16 to press the disc rotor 18. Since the caliper 21 is supported in a floating way, the disc rotor 18 is sandwiched by the two brake pads and it is possible to obtain a stable braking force.

Here, information obtained while the motor 13 is displaced to move the piston 16, relates to the current value fed to the motor 13 and the motor rotation angle by the resolver. Accordingly, the method for controlling the force (piston thrust) pressing the brake pad 17 against the disc rotor 18 may be in general [1] a method for estimating the piston thrust according to the motor torque obtained by the motor current value or [2] a method for estimating the piston thrust from the piston position obtained from the motor rotation angle (motor position) and the rigidity of the entire caliper. Here, in general, the motor current value during piston thrust increase does not coincide with the motor current value during pad release. This phenomenon occurs because the power transmission efficiency of the operation transmission system such as the reduction gear 14 and the rotation-rectilinear movement conversion mechanism 15 is not 100%. The transmission efficiency is changed by the temperature and the lubrication state of the sliding portion. Accordingly, control of the piston thrust by the aforementioned method [1] is actually impossible. Moreover, in the aforementioned method [2], since the piston thrust is controlled in accordance with the motor rotation angle, it is necessary to accurately control the motor angle corresponding to the contact position between the brake pad and the disc rotor. However, as has been described above in the Problems to be Solved by the Invention, it is difficult to accurately detect the contact position between the brake pad and the disc rotor by using the conventional technique. The present embodiment is basically characterized by an electrically operated brake for controlling the piston thrust by the aforementioned method [2] in which it is possible to reduce the braking force difference between the right and the left wheel of a vehicle without requiring an accurate detection of contact position between the brake pad and the disc rotor.

Figure 4:
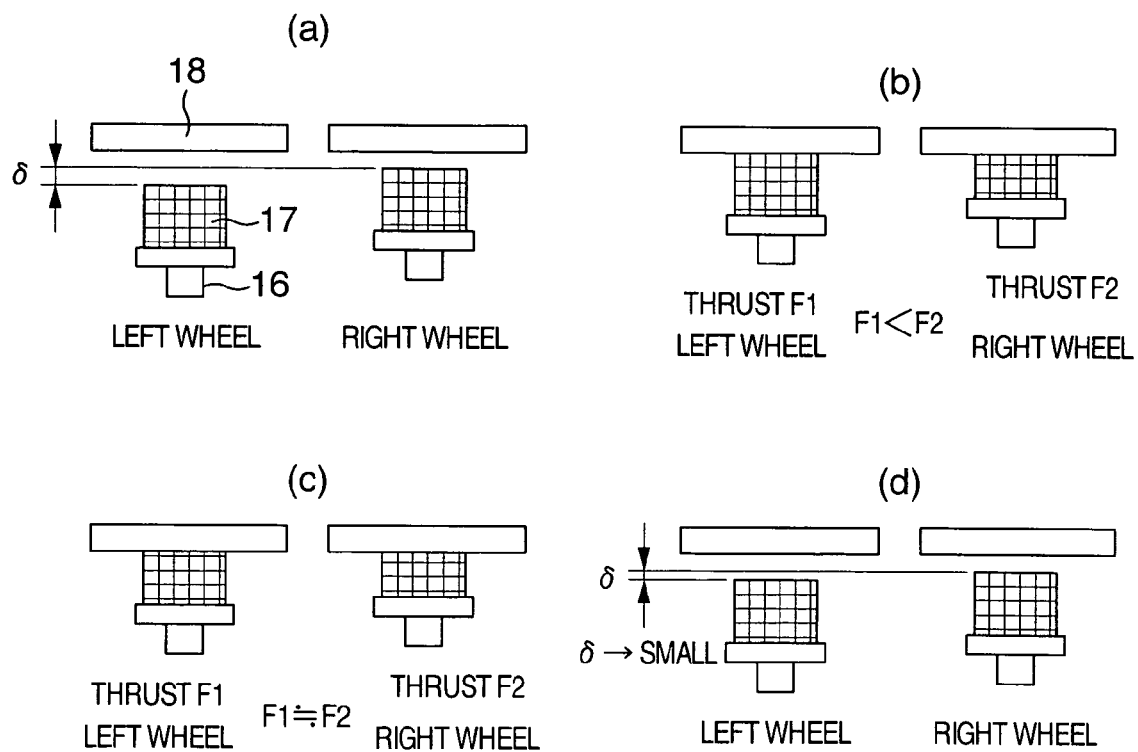
FIG. 4 schematically shows transition of the positional relationship between the brake pad and the disc rotor as the time elapses when the present invention is applied to the electrically operated brakes of the right and left wheels of a vehicle.

Referring to FIG. 4, explanation will be given on movement of each electrically operated brake when the present embodiment is applied to the right and the left wheel of a vehicle. FIG. 4A shows wait positions of the right and the left wheel brake pad 17 during a non-braking state. The difference between the brake pad wait positions of the right and the left wheel is δ. FIG. 4B shows the positional relationship between the brake pad 17 and the disc rotor 18 when the electrically operated brakes of the right and the left wheel are rotated by the same angle. In FIG. 4B, the brake pad of the right wheel is pressed against the disc rotor with a greater force than the left wheel and the piston thrust of the right wheel is greater than the piston thrust of the left wheel. At this moment, the motor current of the left wheel brake is smaller than the motor current of the right wheel brake. FIG. 4C shows a state when the motor current value of the electrically operated brake of the left wheel is increased according to the motor current value of the right wheel in the state of FIG. 4B. By the increase of the motor current value, the motor is rotated and the pressing force of the left wheel brake pad increases than the left wheel brake pad of the FIG. 4B. Here, the piston thrust difference between the right and the left wheel is reduced than the state in FIG. 4B. FIG. 4D shows a state when the motors of the right and the left electrically operated brake are rotated in the direction opposite to the FIG. 4B by the same amount from the state of FIG. 4C. Here, as compared to the state of FIG. 4A, the difference 6 between the gaps between the right and the left brake pad and the disc rotor is smaller.

This is the outline of the method for reducing the difference between the right and the left braking force when the present embodiment is applied to the right and the left wheel of a vehicle.

The present embodiment may be applied to the rear wheel controller 5. Here, referring to FIG. 4 and FIG. 5, explanation will be given on mounting means of the rear wheel controller 5 through an example of the method for matching the braking forces of the rear right and the rear left wheel. The braking force of the electrically operated brake to which the present invention is applied is normally controlled by controlling the motor position (step 1).

When the vehicle is judged to be in a stop state (step 2), a braking force of the front wheels is fixed to a braking force F capable of sufficiently assuring the stop state of the vehicle in order to assure the safety upon operation of the rear wheel braking which will be detailed below (step 3). Next, the motors of the electrically operated brakes of the rear right and left wheels are returned to standard positions corresponding to the wait positions of the brake pads during a non-brake state (step 4) and the motors of the electrically operated brakes of the rear right and left wheels are rotated by an angle θ defined so as to exhibit a sufficient braking force and generate a braking force (step 5). Here, FIG. 4A shows a state when step 4 is complete and FIG. 4B shows a state when step 5 is complete. After the electric waveform has become a stationary state, a motor current $I_L$ of the electrically operated brake of the left wheel and a motor current $I_R$ of the electrically operated brake of the right wheel are measured and a difference between them $\Delta I = I_R - I_L$ is calculated (step 6). It is also possible to output a piston thrust signal by comparing $I_R$ to $I_L$. That is, this step performs a processing calculation for outputting a piston thrust signal based on the inputted current value by the processing device.

Here, an absolute value of $\Delta I$ is compared to a predetermined value ε (step 7). If $\Delta I$ is smaller than ε, no operation is performed to reduce the thrust difference between the right and the left wheel and the normal state is set in (No in step 7). It should be noted that ε is determined according to the braking force difference between the right and the left wheel which makes a vehicle travel unstable. When $\Delta I$ is smaller than ε, this means that no thrust difference is generated between the right and the left wheel to make the vehicle travel unstable. When the absolute value of ΔI is greater than ε (Yes in step 7), the motor current value of the right and the left electrically operated brake are calculated (step 8). If the judgment in step 8 is $I_R<I_L$, the current value of the electrically operated brake motor of the right wheel is increased to $I_L$ (step 9). Moreover, if the judgment in step 8 is $I_R>I_L$, the current value of the electrically operated brake motor of the left wheel is increased to $I_R$ (step 10). It should be noted that as the reverse method of the aforementioned method, it is also possible to reduce the current of a greater value to the current value of a smaller value of the electrically operated brake motor of the right and the left wheel. Moreover, instead of matching the motor current of the electrically operated brakes of the right and the left wheel, it is possible to decide an arbitrary current value to be changed according to ΔI.

As a result of the execution of step 9, the motor is rotated by a rotation angle $\delta\theta_R$ (step 11). Alternatively, as a result of the execution of step 10, the motor is rotated by a rotation angle $\delta\theta_L$ (step 12). FIG. 4C shows a state when step 12 is complete.

As a result of execution of step 9 or step 10, there is a case that no change appears in the motor rotation angle because of the friction of the inner mechanism or the like. In such a case, it is possible to rotate the motor of a smaller current value by a minute angle decided according to the current difference ΔI by the motor position control.

Next, the motors of the right and the left electrically operated brake are rotated in the reverse direction by the angle defined in step 5 (step 13). FIG. 4D shows a state when step 13 is complete. The motor positions of the right and the left electrically operate brake after execution of step 13 are stored as the motor standard positions in the rear wheel controller 5.

The processes of step 5 to step 14 are repeated several times until No judgment is obtained in step 7.

It should be noted that the rotation angle when the motors of the right and the left electrically operated brake are rotated in the direction reverse to the motor rotation direction of step 5 may be different between the right and the left brakes and may be decided, for example, as follows.

When Yes judgment is obtained in step 8, the left wheel electrically operated brake is returned by $\theta+\delta\theta_R/2$ while the left wheel electrically operated brake is returned by $\theta-\delta\theta_R/2$. For example, by setting the motor return angle like this, it is possible to reduce the number of repetitions of the processes of step 5 to step 14 and reduce the power consumption.

In each of the aforementioned steps, the pressing force applied to the brake pedal by the driver is measured and when the pressing force has become a threshold value or below, control is immediately passed to step 1 so that the vehicle can start travelling.

In the disc brake, there is a case that a brake vibration called judder. This phenomenon occurs when rust is generated or a thermal distortion is generated in the disc rotor, which makes the disc rotor thickness non-uniform. When the operations of step 4 to step 14 are performed in the disc brake where judder occurs, there is a possibility not to obtain the right-left wheel thrust difference correction effect if the brake pad is pressed against portions of the disk rotor having different thickness values. To cope with this, the motor standard positions decided when operations of step 1 to step 14 are performed in the past vehicle stop are stored and their statistical operations are performed. For example, by averaging the brake motor standard positions obtained by the thrust difference calibration performed at five vehicle stops in the past, it is possible to reduce the affect of the non-uniform thickness of the disc rotor.

Moreover, in step 5, the motors of the right and the left wheel electrically operated brake are rotated by the angle θ defined so as to obtain a sufficient braking force. By setting the value of θ to a smaller value, it is possible to estimate the contact position between the brake pad and the disc rotor.

Figure 5:
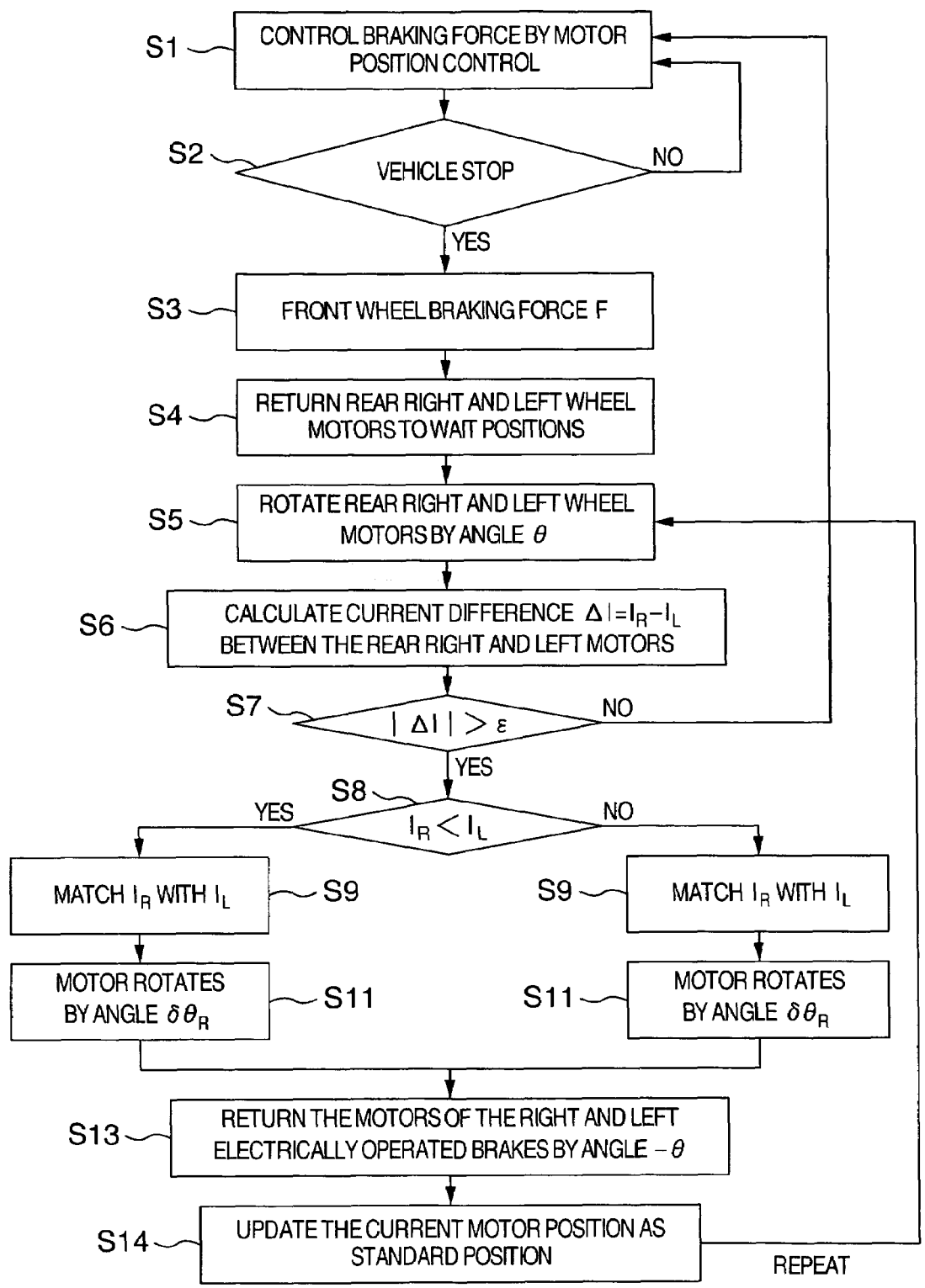
FIG. 5 is a flowchart showing the contents of control of a rear wheel controller in an example of the present embodiment.

When the control process shown in FIG. 5 is applied to the rear wheel controller 5, the following can be checked. A current greater than current flowing in the right wheel electrically operated brake motor is fed as a pseudo event to the current detection device of the motor of the left wheel electrically operated brake so as to perform the operations of step 2 to step 14 shown in FIG. 5. In the operations, the motor current of the right wheel electrically operated brake is increased to coincide with the motor current of the left wheel so as to reduce the braking force difference between the right and the left wheel. Moreover, in the same way, when a current greater than a current value flowing in the left wheel electrically operated brake is fed as a pseudo event to the current detection device of the right wheel electrically operated brake motor, it can be confirmed that the motor current of the left wheel electrically operated brake is increased.

Moreover, by the rear wheel controller 5 to which the control process shown in FIG. 5 is applied, the following can also be confirmed. When the brake pad of the left wheel electrically operated brake is replaced by a brake pad of a greater thickness to generate a braking force, the braking force of the left feel is greater than the braking force of the right wheel. This is because the brake pad of the left wheel electrically operated brake is made greater and the clearance between the left wheel brake pad and the disc rotor during non-braking has become smaller. Accordingly, when a braking force is generated, the current flowing into the electrically operated brake motor of the left wheel is greater than the current flowing into the electrically operated brake motor of the right wheel. When the operations of step 2 to step 14 shown in FIG. 5 are performed here, the motor current difference between the right and the left electrically operated brake becomes smaller. It should be noted that when the brake pad of the electrically operated brake of the right wheel is replaced by a brake pad of a greater thickness to perform the operations of step 2 to step 14 shown in FIG. 5, it can be confirmed that the motor current difference between the right and the left electrically operated brake becomes smaller.

Here, the embodiment of the present invention has been explained through an example of the rear wheels of the vehicle. The same effect can also be obtained when the present invention is carried out for the front wheels.

The invention claimed is:

1. An electrically operated brake comprising:
   right and left motors;
   pistons driven by operation of the respective motors;
   brake pads moved rectilinearly by the respective pistons;
   disc motor sliding by the respective brake pads pressed by the advance of the respective pistons; and
   a control device for controlling displacement amounts of the motors or thrusts of the brake pads;
   a current detection device for detecting values of current flowing in the right and left motors arranged on the rear right and left wheels or/and the front right and left wheels and outputting signals representing the current values; and
   a processing device for performing processing calculation for outputting thrust signals of the piston based on the inputted current values.

2. The electrically operated brake as claimed in claim 1, wherein a standard position of each of the right and left motors is determined based on the detected current values so as to control thrust signals of the pistons based on the respective standard position.

3. The electrically operated brake according to claim 1, wherein the current detection device to conduct current value detection and the processing device to conduct subsequent calculation and outputting are operated in a stopped state of the motor vehicle.

4. An electrically operated brake comprising:

right and left motors;

pistons driven by operation of the respective motors;

brake pads moved rectilinearly by the respective pistons;

disc rotors sliding by the respective brake pads pressed by advance of the respective pistons; and a control device for controlling displacement amounts of the respective motors or thrust of the respective brake pads;

a current detection device for detecting values of current flowing in the right and left motors arranged on the rear right and left wheels or/and the front right and left wheels and outputting signals representing the current values; and a processing device determining a new current value based on the outputted signals, and performing processing calculation for outputting thrust signals of the piston based on the aligned current value.

5. The electrically operated brake as claimed in claim 4, wherein the control device drives the brake pad so that a wait position of the respective brake pad with respect to the respective disc rotor is almost identical when the thrust signal is released.

6. The electrically operated brake as claimed in claim 4, wherein the processing device obtains a difference between the outputted current values of the right and the left motors and compares the current difference to a preset value to decide whether or not to determine the new current value.

7. The electrically operated brake as claimed in claim 4, wherein the processing device obtains a standard position of each motor when release of the thrust signal is repeated a plurality of times, stores the standard position in a storage device, and performs a statistical process for the standard position of each motor, thereby providing a set standard position of each motor.

8. The electrically operated brake as claimed in claim 4, wherein a standard position of each of the right and left motors is determined based on the detected current values so as to control thrust signals of the pistons based on the respective standard position.

9. The electrically operated brake as claimed in claim 4, the electrically operated brake according to claim 1, wherein the current detection device to conduct current value detection and the processing device to conduct subsequent calculation and outputting are operated in a stopped state of the motor vehicle.

10. An electrically operated brake comprising:

right and left motors;

pistons driven by operation of the respective motors;

brake pads moved rectilinearly by the respective pistons;

disc rotors sliding by the respective brake pads pressed by advances of the respective pistons; and a control device for controlling displacement amounts of the motors or thrust of the respective brake pads;

a current detection device for detecting values of current flowing in the right and left motors arranged on the rear right and left wheels or/and the front right and left wheels and outputting signals representing the detected current value; wherein a processing device controls wait positions of the right and the left brake pads so as to be driven according to a difference between the detected current values.

11. The electrically operated brake as claimed in claim 10, wherein the wait position of each of the brake pads is determined based upon the detected current values so as to control thrust signals of the pistons based on the determined wait position.

12. The electrically operated brake as claimed in claim 10, wherein the current detection device to conduct current value detection and the processing device to conduct subsequent calculation and outputting are operated in a stopped state of the motor vehicle.

* * * * *